Aug. 27, 1929.
I. M. THOMAS
1,726,459
RELIEF STEERING WHEEL
Filed June 9, 1928
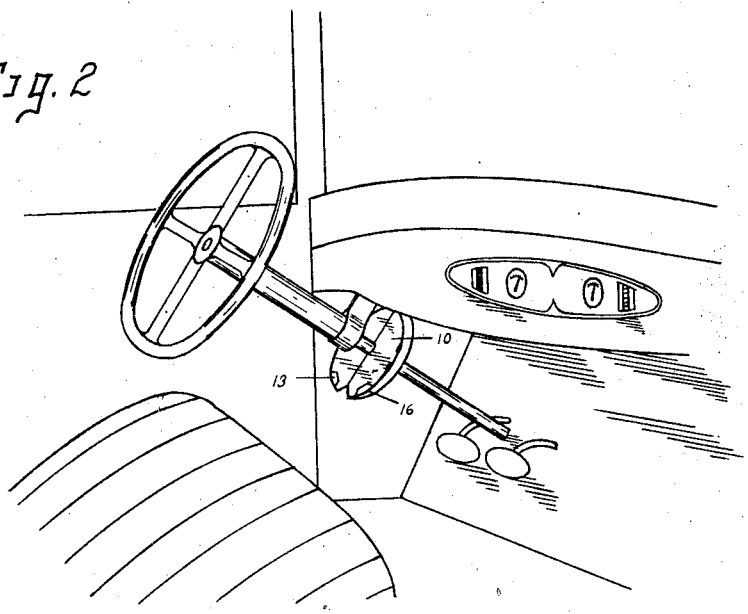
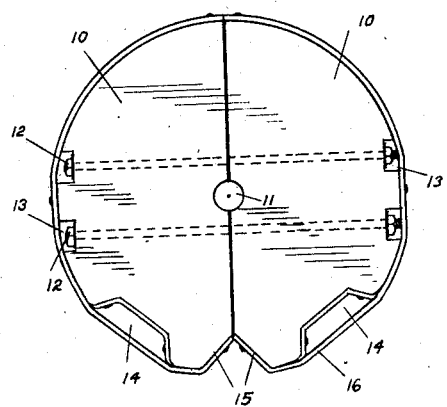
Inventor
I. M. Thomas
By Emil F Lange
Attorney Patented Aug. 27, 1929.

1,726,459

UNITED STATES PATENT OFFICE.

ISAAC M. THOMAS, OF LINCOLN, NEBRASKA.

RELIEF STEERING WHEEL.

Application filed June 9, 1928. Serial No. 284,026.

My invention relates to supplemental steering wheels and its primary object is the provision of a device for enabling the driver of an automobile to use his knees or shins to hold the steering shaft in fixed position or to turn it through arcs of limited extent.

Another object is the provision of a relief steering wheel which is so formed that it may be secured to steering shafts without disassembling the steering shaft and its support.

Still another of my objects is the provision of a supplemental steering wheel which may be adjusted on the steering shaft to the most convenient position for the driver and so that it may be engaged either by the knees or by the driver's shins.

Still another object of the invention is the provision of elastic webbing or the like on the periphery of the wheel, the webbing enabling the driver to secure a greater frictional engagement with the wheel and also acting as a cushion for the convenience of the driver.

Having in view these objects and others which will be pointed out in the following description, I will now refer to the drawings, in which Figure 1 is a plan view of the relief steering wheel showing the two sections with the clamping means and showing also the notched arrangement at the periphery of the wheel and the elastic webbing surrounding the wheel.

Figure 2 is a view in perspective of a portion of an automobile in which the relief steering wheel is secured to the steering shaft.

As best shown in Figure 1 the supplemental wheel is formed of two semicircular halves 10 which are identical in all respects. They are preferably formed from wood of suitable thickness but they may be cast in metal or struck out of sheet steel or other sheet metal. With slight modifications they may be formed of strap metal which has been bent into semicircular form. Each half 10 is provided with a semicircular aperture 11 at the center of sufficient size so as to snugly embrace the steering shaft when the two halves 10 are assembled. For assembling bolts 12 are employed, these bolts passing through suitable aligned apertures in the two halves 10 as shown in dotted lines in Figure 1. The halves 10 at their peripheries are provided with sockets or notches 13 for receiving the bolt heads and the nuts of the bolts 12. By this means the wheel may be secured by assembling the two halves 10 about the steering shaft and then drawing the bolts 12 tight so that the wheel will be clamped to the steering shaft.

Each of the halves 10 is provided with a notch 14 for receiving one of the driver's knees or shins. Each half 10 is furthermore beveled at 15 so that the assembled wheel will have a V-shaped notch immediately in front of the driver. The strap of elastic webbing 16 surrounds the entire wheel, being secured thereto by tacks or other suitable fastening devices. It will readily be apparent that when the driver's knees or shins are seated in the notches 14, the relief steering wheel and the steering shaft may be firmly held against turning and it may be given limited turning movements by the movements of the driver's legs.

The V-shaped notch formed by the beveled surfaces 15 has two functions. The turning of the supplemental steering wheel usually involves but very slight angular movements which are useful chiefly when the driver is driving mainly in a straight line. Sudden emergencies, however, sometimes arise which require that the driver swerve the automobile through a larger arc than that permitted by a fixed engagement of his shins with the supplemental wheel. In such cases it is only necessary to step the arcuate movement by first shifting the wheel through an arc by the action of one leg and then moving that leg into engagement with the V-shaped notch while the other leg holds the wheel steady, after which the wheel may be again shifted. The V-shaped notch is also important in the proper centering of the supplemental steering wheel on the steering shaft since it is essential that the wheel be accurately positioned so that the middle point between the notches 14 is directly in front of the driver or in the rear of the steering shaft.

The diameter of the supplemental steering wheel may be varied as desired but it must usually be made in a size required by the construction of the automobile. The diameter of the wheel is also largely governed by the size of the driver. The same thing is true of the size and relative positions of the two notches 14 since some drivers will find it more convenient to have these notches spaced differently than others. The wheel may also be clamped to the steering shaft at any one of numerous heights for the convenience of the driver. These features are all of extreme importance and it is to be understood that the relief steering wheel which I have described is to be subject to variation in any and all of these respects.

The use of the relief steering wheel enables the driver to take his hands off the hand steering wheel and to drive under certain conditions by controlling the relief steering wheel. Such driving is frequently desirable to relieve the driver of the continuous strain of hand steering and it sometimes becomes necessary as when it is desired to use the hand for signalling to other users of the road. The use of the relief steering wheel in no way interferes with the operation of the clutch and brake pedals and in this connection it should be noted that the adjustment in position of the wheel on the shaft makes it possible to position the wheel so that it will be most convenient for the actuation of the foot controls.

It is understood, of course, that the steering shaft to which my relief steering wheel is applied must have an exposed portion at a convenient height. Some cars as the Hudson and Essex are so designed that the relief steering wheel may be applied without difficulty. In cases where the steering shaft is entirely enclosed it is necessary that a portion of the shaft be exposed to receive the supplemental wheel or that a steering arrangement be substituted which will permit the installation of the relief steering wheel.

Having thus described my invention in such full, clear, and exact terms that its construction and operation will be readily understood by others skilled in the art to which it pertains, what I claim as new and desire to secure by Letters Patent of the United States is:

1. A relief steering wheel adapted to be secured to the steering shaft of an automobile, said wheel being provided with a pair of notches in the periphery thereof for receiving the driver's shins, and elastic webbing secured to the periphery thereof to cover the notches in said wheel.

2. A relief steering wheel adapted to be secured to the steering shaft of an automobile, said wheel being provided with a pair of notches in the periphery thereof for receiving the driver's shins and being also provided with a V-shaped notch intermediate the pair of notches, and elastic webbing secured to the peripheral surface of said wheel to cover all of the notches thereof.

In testimony whereof I affix my signature.

ISAAC M. THOMAS.